INVENTOR.
LENNART K. PETTERSSON

INVENTOR.
LENNART K. PETTERSSON

May 18, 1971 L. K. PETTERSSON 3,579,620
BLOW MOLDING
Filed Nov. 26, 1968 5 Sheets-Sheet 4
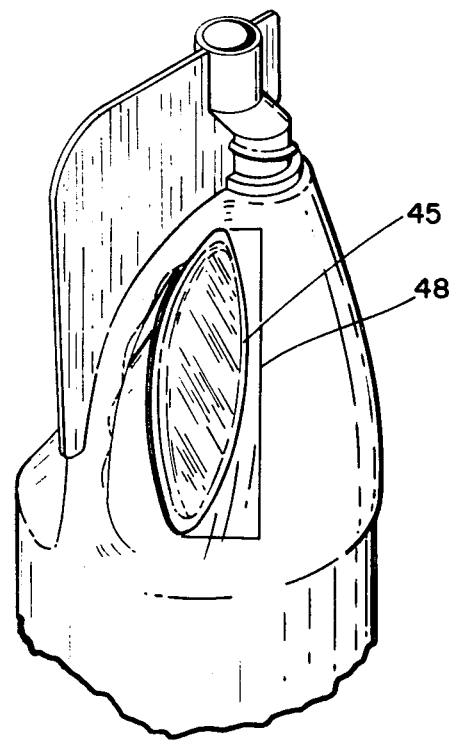
FIG. 5
FIG. 7
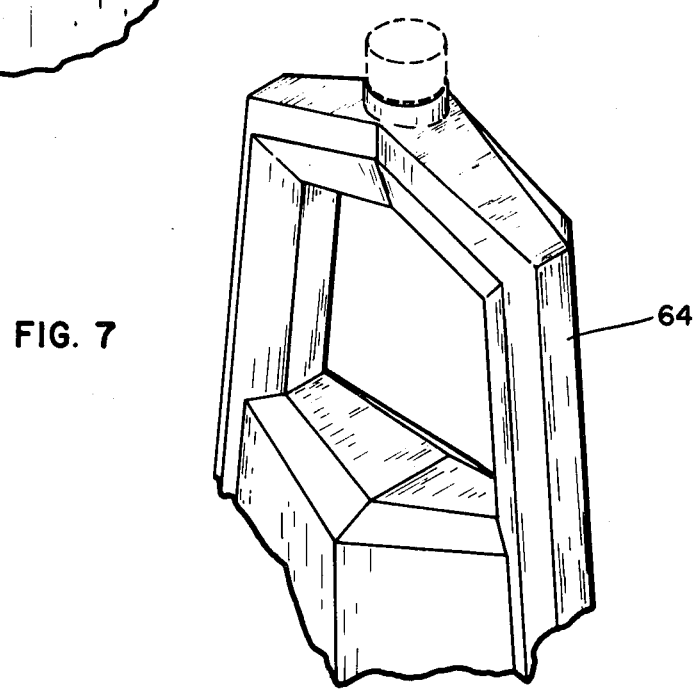
INVENTOR.
LENNART K. PETTERSSON
BY
Michael J. Murphy
ATTORNEY United States Patent Office 3,579,620
Patented May 18, 1971

3,579,620
BLOW MOLDING
Lennart K. Pettersson, Bloomfield, Conn., assignor to
Monsanto Company, St. Louis, Mo.
Filed Nov. 26, 1968, Ser. No. 778,995
Int. Cl. B29c 17/07
U.S. Cl. 264—98                                15 Claims

ABSTRACT OF THE DISCLOSURE

Parison pinch off surfaces of a blow mold and/or the area of the mold defining an opening extending through the body of a handleware container are kept at elevated temperature in comparison with remaining cooled portions of the mold during closing of the mold sections and formation of the article, in order to facilitate subsequent removal of waste flash which is integrally formed with the article in these areas of the mold.

---

This invention relates generally to blow molding and in particular to removal of waste flash integrally formed with a blown plastic article.

In the manufacture of blown plastic articles, it is conventional to enclose an extruded thermoplastic tubular blank or parison between partible sections of a blow mold and then to expand the blank against cooled internal walls of the mold to form the article. When the mold sections are closed on the blank, pinch off surfaces of the sections compress together opposing wall portions of the blank in a conventional manner into a thin web around peripheral portions of the body defining cavity of the mold. This web, along with additional integrally attached waste plastic outside the article defining periphery of the mold cavity constitutes waste material which is commonly known as flash, and which must be removed from the formed container, usually in a finishing operation. These pinch off surfaces are conventionally machined as an integral part of the blow mold, and therefore they assume whatever is the temperature of the remainder of the mold, which is usually low in order to set the plastic of the container as rapidly as possible and keep the forming cycle at a minimum. However, when a pinch off surface contacts a portion of the extruded blank during closing of the mold in the conventional manner, it chills and sets the plastic in this area in comparison with the condition of other portions of the blank which are out of contact with the mold into the shape of the article. Needless to say, the thicker the welded portion of web holding the integrally formed flash to the article, the more difficult it is to later removed it, and likewise the greater the possibility of unsightly residual flash remaining attached to the article. Consequently, unusually high mold closing forces and sharp pinch off surfaces which are prone to rapid wear have been required to close the mold sections sufficiently tight to form a relatively thin web which can be later cleanly snapped off the article along with other attached flash.

When the blown article is a container of the type wherein an opening is provided within the confines of and extends through the body adjacent a hollow handle, flash is formed on closing the mold in the area which eventually defines the handle opening. The same problems exist with respect to this flash as with that attached around the outer periphery of the article, i.e. difficulty of removal of undesirable residual portions left attached to the article around the handle opening after the finishing operation, resulting in a high number of off-grade containers, or even the need for a subsequent flame polishing step.

Mechanical means mounted on the mold section for tearing the flash away from the article on opening of the mold halves have been used in the past, however this complicates the mold design and tends to extend the forming cycle since the flash usually must be cooled before the removal means become effective.

Now there has been discovered a new and improved method and apparatus for facilitating the removal of waste flash integrally formed with an article in a blow molding operation.

Accordingly it is a principal object of the invention to provide an improved method and apparatus for blow molding containers which overcome the prior art difficulties discussed above.

An additional object of this invention is to provide an improved method and apparatus for producing blow molded containers of the handleware variety.

A further object of this invention is to provide a method and apparatus for improving the quality of pinch welds in a blow molding process.

Another object of this invention is to provide an improved method and apparatus wherein formation of rather thick webs holding integral waste flash to the body of a blow molded container is avoided.

Yet another object of this invention is to provide a method and apparatus for facilitating removal of waste flash from a blow molded container, especially of the type having a handle opening in the body portion thereof.

An additional object of this invention is to provide an improved method and apparatus for accomplishing the above mentioned objects in a relatively inexpensive manner requiring only minor modifications to existing equipment.

Other objects of this invention will in part be obvious and will in part appear hereinafter.

These and other objects are accomplished in a blow molding process by insulating flash which is integrally formed with the article from remaining cooled internal portions of the blow mold in order to maintain the flash, which may include peripheral pinch weld portions, at an elevated temperature in comparison with the remainder of the heat plastified tubular blank during closing of the mold sections and formation of the article in order to facilitate subsequent removal of this flash from the article. Insulating may be achieved by means of an air gap or solid layer of insulating material between the cooled mold walls and the flash material. When the blown article is a handleware container having a handle opening within the confines of its body, a scrap or flash portion in the mold area defining the handle opening along with a body portion of the article are differentially cooled to set the thermoplastic in the first cooled of these portions before setting it in the other, whereby the second cooled portion shrinks and pulls away from the first cooled portion leaving the scrap portion at least partially separated from the body portion. A mold is provided for such a handleware container wherein a second cavity is situated within a first body defining cavity and has a cross sectional dimension taken in a direction perpendicular to the parting line of the mold which is greater than twice the thickness of the wall of the tubular blank, in order to avoid contact of the blank with the surface of the second cavity when the mold sections are closed.

In describing the invention, reference will be made to preferred embodiments illustrated in the accompanying drawings in which.

Figure 1:
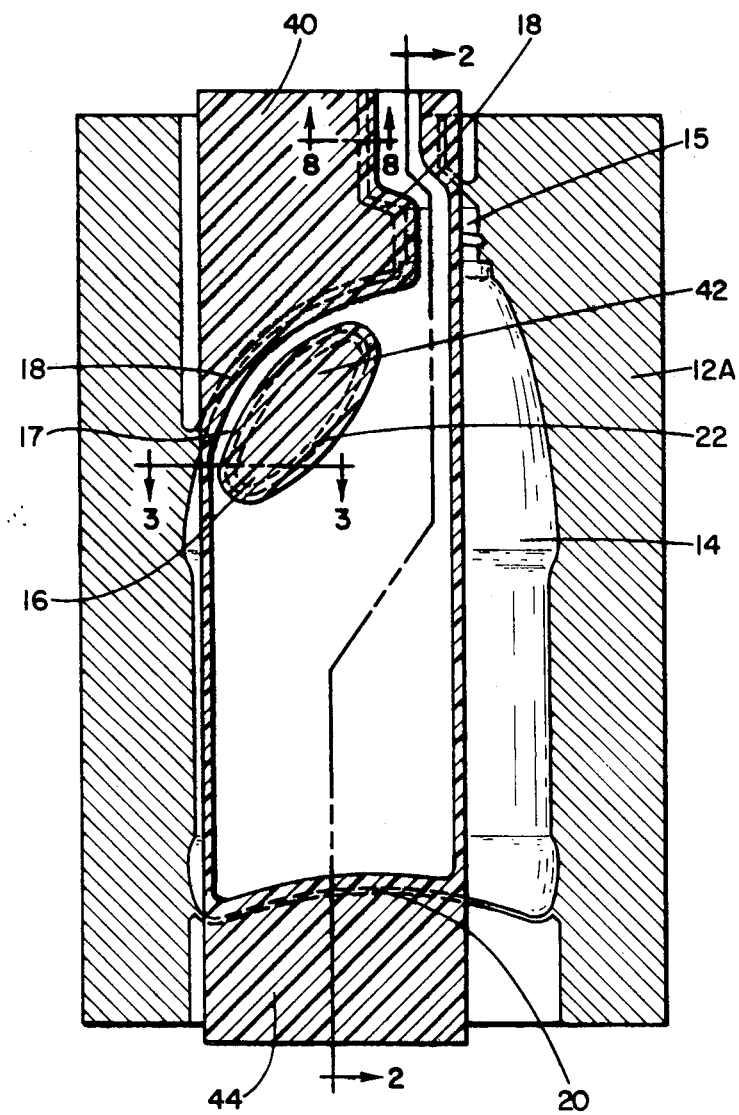
FIG. 1 is a schematic, vertical, partially sectioned view taken along the parting line of a blow mold after the mold is closed and prior to introduction of pressurized fluid into the tubular blank enclosed therein.
Figure 3:
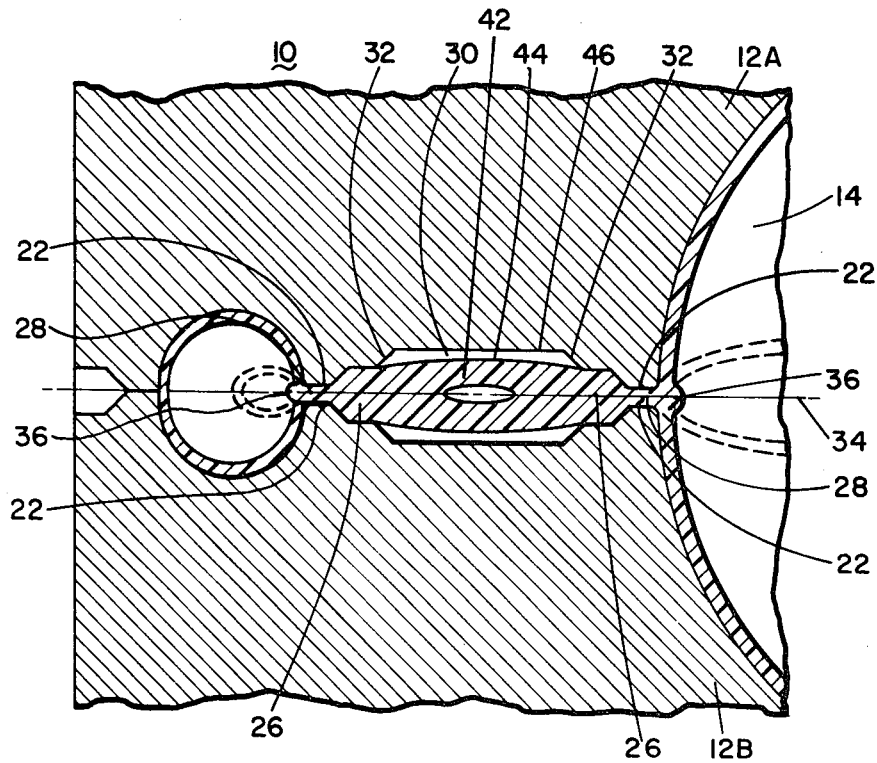
FIG. 3 is an enlarged sectional view along the line
Figure 4:
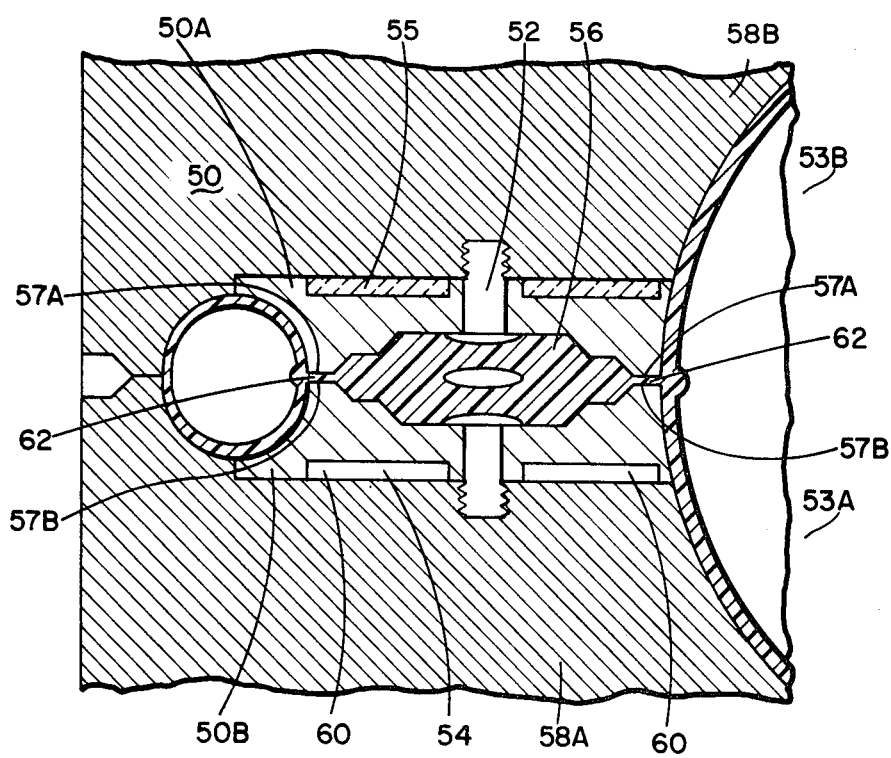
Figure 6:
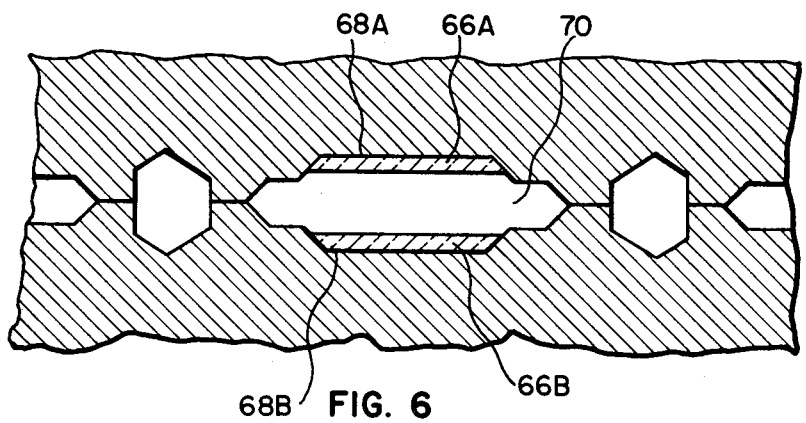
Figure 8:
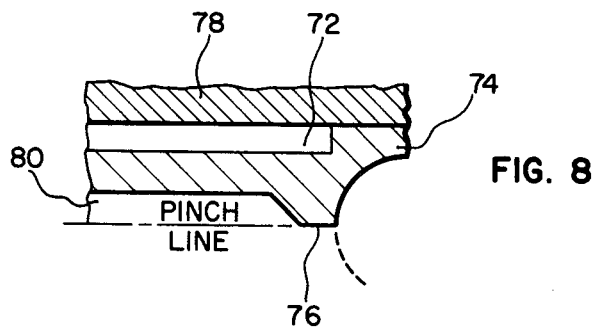

3—3 of FIG. 1, illustrating the distribution of plastic in this area of the mold before and after introduction of pressurized fluid into the blank;

FIG. 4 is a view similar to FIG. 3 illustrating an alternate embodiment of the invention;

FIG. 5 is a perspective view of the upper end of a container formed with the apparatus of FIGS. 1–4 prior to flash removal therefrom;

FIG. 6 is a view similar to FIG. 3 of an alternative form of mold design;

FIG. 7 is a view similar to FIG. 5 of a bottle formed with the mold of FIG. 6;

FIG. 8 is a sectional view taken along the line 8—8 of FIG. 1; and

Figure 9:
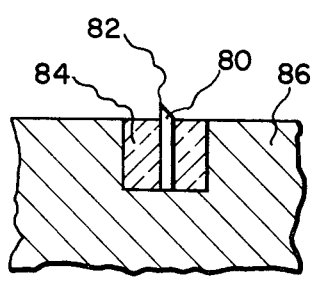

FIG. 9 is a view similar to FIG. 7 showing an alternative form of mold land construction.

With reference to the drawings, wherein identical numerals refer to identical parts, there is shown a partible blow mold 10 comprising separable halves 12A and 12B, each of which has an intrnal portion 14. The walls of portion 14 conform to the periphery of the body of an article which is formed therein when the mold halves are closed around a heat plastified thermoplastic tubular blank which has issued from an extruder in a conventional manner and which is then expanded therein. Internal portion 14 includest the neck 15 and handle 17 defining surfaces of the mold when the article is a container of the type typically depicted in FIGS. 5 and 7.

Figure 2:
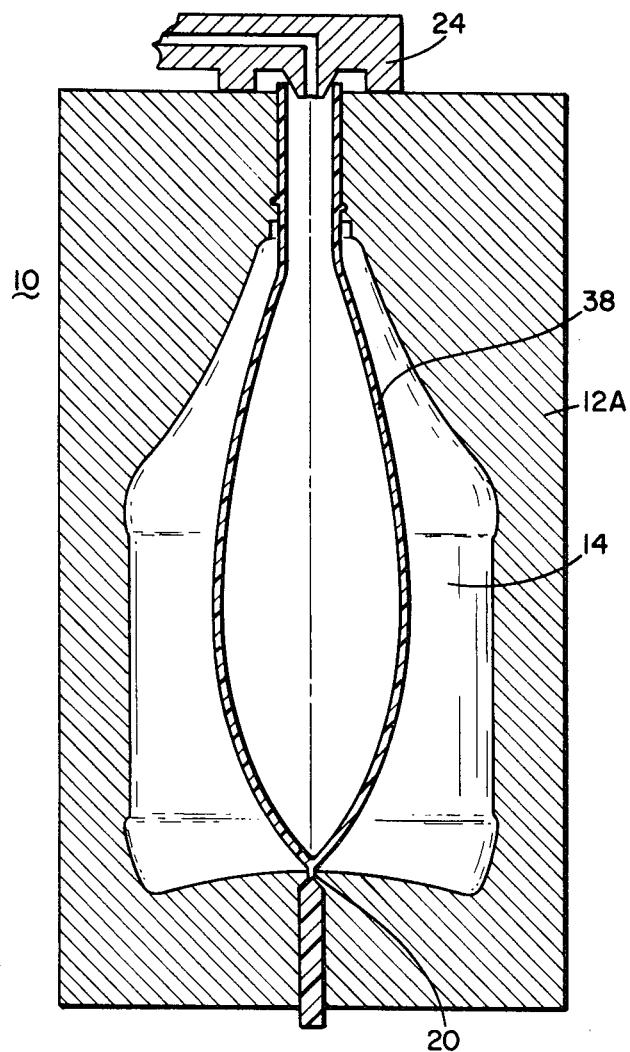
FIG. 2 is a view similar to FIG. 1 taken along the line 2—2 of FIG. 1 showing a blow nozzle in place prior to expansion of the blank.

Partible halves 12A and 12B have additional internal portions defining a second cavity 16 within first cavity 14 when the halves are aligned opposite each other in closed position. The periphery of cavity 16 conforms to the periphery of a handle opening when the article being formed is a container of the type shown in FIG. 5, and alternatively in FIG. 7. Pinch off surfaces 18 and 20 are provided opposite each other on each mold half extending around upper and lower portions of mold internal portion 14. Similarly constructed pinch off surfaces 22 extend around the entire periphery of second cavity 16. These pinch off surfaces in each case serve to compress and fuse together opposing wall portions of a heated thermoplastic tubular blank on closing the mold sections thereon as illustrated in FIGS. 1 and 2. Each half 12 of mold 14 is conventionally (not shown) cored throughout portions of its cross section outside the first and second cavities thereof. A cooling fluid may be circulated through these cores in a conventional manner to cool the cavity surfaces for the purpose of setting the plastic which comes into contact therewith when a pressure differential is generated on the enclosed blank to expand the blank against these cavity surfaces and form the article. This expansion is accomplished in a conventional manner by introducing a pressurized fluid into the blank through a passage in a blow nozzle 24, as typically depicted in FIG. 2.

Turning now to the mold structure in the handle opening area of the mold as depicted in FIG. 3, second cavity 16 has intermediate portions 26 adjacent narrower outer peripheral portions 28. Incrementally spaced opposing pinch off surfaces 22 define outer peripheral portions 28 when the molds are in closed position. Surfaces 32 extend inwardly from the walls of intermediate portions 26 to inner portion 30 situated between intermediate portions 26 of cavity 16. The width of each section 26 measured in a direction perpendicular to the parting line 34 of the mold is reduced over that for portion 30 to aid in forcing plastic outwardly into the seam area 36 of the container around the handle opening thereof during closing of the mold sections, in order to reinforce the seam and prevent its cracking during subsequent use of the container. Inner portion 30 of cavity 16, however, has a cross sectional dimension also taken in a direction perpendicular to the mold parting line which is substantially greater than twice the thickness of the wall of the tubular blank.

In operation, mold halves 12 are brought together around heat plastified tubular blank 38 to pinch off certain portions of the tubular blank as explained previously, leaving the plastic distribution in the handle opening or handle eye area after closing of the mold in the general condition outlined in phantom in FIG. 4. This action of closing the mold also inherently produces various waste flash portions from the tubular blank which are shown as 40 around the neck defining area, as 42 in the handle eye area and as 44 along the bottom portion of the mold. This flash in each case is integrally joined to the article by the pinched off thin web portion of plastic typically shown at 45 in FIG. 5, and which is herein also intended to constitute a portion of waste flash material. Each of these various flash portions must be removed after the blank has been expanded into the shape of the article, and it is with facilitating this removal with which the present invention is concerned.

After closing the mold sections, pressurized fluid is introduced through the open end of the tubular blank (FIG. 2) to expand the blank against the article periphery defining walls of the mold. These walls, as mentioned, are maintained at as low a temperature as possible without resulting in condensation at atmospheric moisture thereon in order to rapidly reduce the plastic below its heat plastifying temperature, thereby setting the plastic in as short a time as possible to permit early ejection of the formed container from the mold and immediate commencement of a subsequent cycle. Scrap or flash portion 42 in the second cavity portion 16 of the mold is isolated from the body defining portion thereof after the halves are closed since its peripheral portion is welded together between pinch off surfaces 22. Its distribution is therefore not altered by the presure of the fluid used to expand the hot blank. In other words, the distribution of plastic in mold cavity 16 as depicted in FIG. 3 after closing of the mold halves is the same after expansion of the blank into the shape of the article as it was after closing of the mold and prior to this expansion. Also, as illustrated in FIG. 3, a major portion of the handle flash in second cavity portion 16 of the mold is insulated from the surrounding cooled internal portions of the mold in order to maintain this substantial portion of the handle flash at elevated temperature in comparison with the remainder of the tubular blank which has contacted the cooled mold surfaces either during closing of the mold sections or during subsequent formation of the article by expansion of the enclosed blank. This insulating effect is accomplished in the embodiment of FIG. 3 by means of an air gap between the outer surface 44 of the handle flash and the opposing surface 46 if inner portion 30 of the second cavity 16 of the mold. This air gap is made possible by maintaining the depth in a direction perpendicular to molding parting line 34 of inner section 30 of second cavity 16 substantially greater than twice the thickness of the wall of the tubular blank, so that after the mold halves are closed the plastic in this area has the appearance illustrated in FIG. 3. By operating in this manner, the body portion of the container surrounding the eventual handle opening and the handle scrap 42 situated in second cavity 16 of the mold are differentially cooled since the body portion is in contact with the cooled internal walls of the mold and is reduced to below the heat plastifying temperature of the thermoplastic and thereby rapidly set and solidified. The temperature of a substantial portion of the handle scrap, on the other hand, is kept above that of the surrounding body during cooling thereof by means of the insulating effect of the air gap between inner portion 30 and the flash in second cavity 16. As the temperature of the handle scrap subsequently reduces to below its heat plastifying temperature, as governed, for example, by the temperature of the surroundings in the blow molding processing area, the plastic defining the handle scrap portion in the inner section 30 of second scrap cavity 16 shrinks and partially or completely pulls away from the body of the article along the thin connecting web around the periphery of the surrounded handle opening. It should be noted that the scrap portion on which this separating technique is utilized is completely surrounded around its full periphery by portions of the container body which have already been cooled and set. The resulting position of the handle flash 42 after it has been set and has reached the temperature of the container body is typically depicted as 48 in FIG. 5. This substantial pulling away of the handle flash from the body greatly facilitates the ease with which it may be completely removed from the formed container in a downstream finishing operation after the container is removed from the mold. Of course complete removal by this differential cooling technique would entirely eliminate the need for a subsequent finishing step in the process. During finishing, the flash may optionally be either manually snapped away from the container body or be punched out by means of a plug cooperating with an opposing die in a conventional automated trimming line.

In the embodiment of the invention illustrated in FIG. 4 there is depicted a handle insert 50 situated in the handle eye area of the mold comprising portions 50A and 50B and which is inserted into each mold half and attached thereto by conventional means such as bolts 52. Alternative ways of attaching may be my means of adhesive, welding, etc. Insert 50 has a slot 54 in each half which may be left open as shown in mold half 53A of FIG. 4, or may be provided with a layer of insulating material such as ceramic 55, as illustrated in mold half 53B. In this manner, the portions of the handle insert which define the walls and pinch off web forming surfaces of a scrap cavity 56 are kept insulated from the remaining cored and cooled internal portions 58A and 58B of the mold. With the structure of FIG. 4 the differential cooling of the handle scrap and surrounding body after expansion of the tubular blank is accomplished in the same manner as previously mentioned. With this embodiment, the need to machine the scrap cavity to a depth greater than twice the thickness of the wall of the tubular blank may not be necessary as depicted in FIG. 4, since insulating is achieved on each side of the parting line by either air gap 54 or insulating material 55. Such a cavity depth may, however, be optionally provided in combination wtih the configuration of FIG. 4.

Also as depicted in FIG. 4, slot 54 which may optionally have insulating material 55 situated therein, may be sufficiently elongated so as to have a portion 60 which lies between pinch off surfaces 57A and 57B and the cooled portions 58A and 58B of the mold. Pinch off surfaces 57A and 57B extend around the periphery of scrap cavity 56. With this arrangement, surfaces 57A and 57B between which the tubular blank is pinched are insulated from cooled internal portions 58A and 58B both during and after closing of the mold sections, in order to keep the portions 62 of the tubular blank between pinch surfaces 57A and 57B, which define the web connecting the handle flash to the article body, at elevated temperature, thereby enhancing fusion of these tubular blank portions 62 during pinching. In other words, the prior art approach of allowing the pinch surfaces to assume essentially the same temperature as that of the remainder of the mold, so that as the mold closes the plastic stock therebetween becomes progressively cooler until it is substantially solidified when the halves are in their closed position, is avoided. By maintaining the plastic defining the connecting web above the heat plastifying temperature during mold closing, a substantially thinner web as depicted in FIG. 4 is obtained in comparison with that of FIG. 3, since the hot plastic may be more easily squeezed together and thinned out by the peripheral margin defining pinch off portions 57A and 57B of the handle opening area of the mold. In this way the clamping forces required to adequately close the mold halves to form a web which can be readily removed may be reducer, or a thinner web may be obtained for a given force. Also, when both the flash portion 62 defining the thin attaching web and the remainder of the flash in the handle scrap cavity are insulated from the remaining cooled mold portions 58A and 58B as depicted in FIG. 4, the differential cooling of scrap 62 and surrounding container body, as outlined previously, results in enhanced separation or pulling away of the handle scrap from the surrounding body over that achievable when only the internal portion of the handle scrap is insulated as in FIG. 3, since the web attaching the scrap to the body is thinner than that obtained when the pinch off surfaces are at essentially the same reduced temperature as that of the remainder of the mold.

In FIG. 6 is depicted an alternative type of mold configuration in the handle eye area which is used for forming the container 64 of FIG. 7, wherein the handle opening is symmetrically located within the confines of the container body. Insulated layers 66A and 66B are illustrated as being adhesively attached directly to mold surfaces 68A and 68B of scrap cavity 70 in the handle eye area of the mold. Though layers 66 are shown attached to only portions of the surface of scrap cavity 70, they obviously may be extended to cover the entire surface of cavity 70 including the peripheral pinch off surfaces thereof. These insulating layers achieve the same result as does the air gap insulation of FIG. 3. In all other respects the method of differential cooling and resulting scrap separation from the surrounding body are equivalent to that previously described.

In FIG. 8 is shown slot 72 in a neck insert 74 which serves to insulate pinch off surface 76 (one shown) from the adjacent cooled internal portion 78 in the neck area of the mold of FIG. 1. The thin web formed by cooperating insulated pinch off surfaces 76 thus facilitates snapping away of the neck flash 40 (FIG. 1) which is formed in cavity 80 on closing the mold sections. A similar insulating effect could be achieved along the bottom of the mold to facilitate downstream removal of lower flash portion 44 from the formed article. Thus the concept of insulated pinch off surfaces need not be confined to a mold cavity portion within the body defining portion of the mold, but rather is equally applicable in other areas of the mold where pinch off surfaces or lands define a thin web of plastic attached to the formed article.

In FIG. 9 is depicted an alternative means of accomplishing the insulated pinch land concept of the present invention. Member 80 has surface 82 which corresponds to pinch off surface 76 in FIG. 7, and is mounted in a bed 84 of insulating material situated in a cooled mold portion 86. Insulation 84 serves to minimize the effects of the cooled mold on pinch off surface 82 which comes into contact with the tubular blank on closing the mold halves, thus keeping the temperature in this area of the blank in the heat plastified state during closing of the mold.

The above description and particularly the drawings are set forth for the purposes of illustration only and are not to be taken in a limited sense.

The present invention utilizes the novel concept of cooling the body portion of a blown thermoplastic article which surrounds a flash portion within the confines of the article body while keeping this flash portion at elevated temperature, in order to maintain it relatively soft and pliable until the plastic of the body is set, whereupon this flash portion is then allowed to cool with the result that the stress forces established in the plastic of the flash as it shrinks and sets causes the flash to at least partially pull away around its periphery where attached to the previously cooled body portion. In other words, the two areas are cooled below their heat plastifying temperature consecutively rather than concurrently. The flash is preferably a portion which eventually defines the handle opening in the formed container. Alternatively, the scrap plastic could be set initially while the article body is maintained at elevated temperature, followed by cooling of the body so that the body pulls away from the previously set flash. Equivalent results should be attained since differential cooling occurs in each case. Obviously cooling of the second of the two portions may be accelerated to decrease cycle time by exposure to a chilling medium if it is desired to increase the heat transfer rate over that attainable by exposure to the surroundings.

Insulating the pinch lands of the mold permits reducing the thickness of the web by which the flash is integrally attached to the body of the article for a given mold clamping force. This feature of the invention may be used to advantage in any area of the mold wherein flash is integrally attached to the formed article. Results are improved to the extent that residual flash left attached to the article afer the major portion thereof has been snapped off is reduced or entirely eliminated. When combined with insulating the handle eye area of the mold, exceptionally good separation of the handle flash is achieved, since the stresses developed on uneven cooling are acting across an attaching web of reduced thickness.

The plastic portion which it is desired to keep at elevated temperature may be kept in such a state in a variety of ways, it being only necessary to utilize means to minimize the transfer of heat from the plastic to the surrounding cooled area of the mold. Alternatively to the utilization of air as an insulating material, ceramic or any other conventional insulation which does not adhere to the plastic on contact therewith may be used. A hot fluid, e.g. oil or water at elevated temperature could even be circulated through the handle eye area of the mold to selectively heat this section while maintaining it insulated from the remainder. However, care must be taken to avoid having mold portions between which flash is formed at too high a temperature, since the quality of the adjoining body portion, e.g. the handle, could be adversely affected by the heat, which might cause it to sag and fall away from its mold defining surface after the fluid pressure within the mold has been relieved. The same flow channel(s) through which a heating fluid is circulated might also be utilized to circulate a cooling fluid through the handle eye area of the mold after the plastic of the body portion of the article has been set. The temperature of the plastic when in its heat plastified state prior to contact with the mold generally ranges between about 300–450° F. for most thermoplastics, whereas the temperature of the cooled internal portions of the mold ranges between about 35–75° C.

The present invention is useful in any blow molding process to facilitate removal of flash material integrally formed with the article on closing the mold sections, but is especially useful when the article being formed is of the handleware variety having a handle opening within the confines of the body of the article.

Various other modifications and alterations will be readily suggested to persons skilled in the art without departing from the spirit and scope of the invention.

What is claimed is:

1. In the method of blow molding a hollow article by enclosing a heat plastified thermoplastic tubular blank within partible sections of a blow mold having internal portions including walls which conform to the periphery of the article whereby flash is formed from a portion of said blank as a result of said enclosing by the mold sections, expanding another portion of said blank against said periphery conforming walls to form the article integrally attached to the flash and circulating a cooling medium through said blow mold sections after expansion to set the thermoplastic defining the article the improvement which comprises maintaining said flash at an elevated temperature which is greater than that of the article while the article is being cooled within the mold sections such that said scrap shrinks when it cools and pulls away from the cooled integrally attached article, thereby facilitating separation of the flash from the article.

2. The method of claim 1 wherein the elevated temperature of the flash is achieved by means of an air gap between pinch off portions of the mold and internal portions of the mold cooled by said cooling medium.

3. The method of claim 1 wherein the article is a container having a handle opening within the confines of the body of said container and the elevated temperature of the flash is achieved by means of an air gap between a flash portion and mold surfaces in the section of the mold defining the handle opening, said air gap being maintained during and after expansion of the blank.

4. In the method of blow molding a hollow article by closing partible sections of a blow mold having cooled internal portions including walls conforming to the periphery of the article around a heat plastified thermoplastic tubular blank to pinch off portions of said blank and then expanding said enclosed blank against said periphery conforming walls, the improvement comprising insulating mold portions between which said tubular blank is pinched off on closing the mold sections from the cooled internal portions of the mold to keep the portions of the tubular blank between said mold portions which pinch off the blank at elevated temperature to enhance fusion of said tubular blank portions during pinching.

5. A method of blow molding a container having a handle opening within the confines of a body portion of said container comprising the steps of:
 (a) positioning a heat plastified thermoplastic tubular blank between partible sections of a hollow mold having internal portions including walls which conform to the periphery of the body portion and to the periphery of the handle opening of said container;
 (b) closing said mold sections to pinch off said blank;
 (c) generating a pressure differential on said blank to expand portions of said blank against the mold wall portions conforming to said body portion to form the body portion of said container; and
 (d) cooling the body portion below the heat plastified temperature of said thermoplastic while maintaining an integrally attached adjoining scrap portion situated in the area of the mold defining the handle opening of said container at an elevated temperature to set the thermoplastic in said body portion before setting the thermoplastic in the scrap portion, whereby the scrap portion on cooling shrinks and pulls away from said body portion leaving said scrap portion at least partially separated from said body portion.

6. A method of blow molding a container having a handle opening within the confines of a body portion of said container comprising the steps of:
 (a) positioning a heat plastified thermoplastic tubular blank between partible sections of a hollow mold having internal portions including walls which conform to the periphery of the body portion and to the periphery of the handle opening of said container;
 (b) closing said mold sections to pinch off said blank;
 (c) insulating peripheral margin defining portions of the handle opening of the mold from cooled internal mold portions to enhance fusion of a portion of the tubular blank around the peripheral margin of said handle opening during pinching thereof by said margin defining portions on closing the mold sections;
 (d) generating a pressure differential on said blank to expand portions of said blank against the mold wall portions conforming to said body portion to form the body portion of said container; and
 (e) differentially cooling the body portion and a scrap portion situated in the area of the mold defining the handle opening of said container below the heat plastifying temperature of said body and scrap portions to set the thermoplastic in the first cooled of said body and scrap portions before setting the thermoplastic in the other of said body and scrap portions, whereby the other of said body and scrap portions shrinks and pulls away from the first cooled of said body and scrap portions leaving said scrap portion at least partially separated from said body portion.

7. The method of claim 6 wherein differential cooling is accomplished by bringing the body portion of the container into contact with said cooled internal mold portions while keeping the scrap in the mold portion defining the handle opening substantially out of contact with said mold.

8. The method of claim 7 wherein the scrap in the mold portion defining the handle opening is kept substantially out of contact with said mold by insulating it therefrom.

9. The method of claim 8 wherein insulating is accomplished by means of an air gap between said scrap and said mold.

10. The method of claim 8 wherein insulating is accomplished by means of a solid layer of insulating material between said scrap and said mold.

11. A blow mold for shaping a hollow article comprising:
(a) partible mold sections having cooled internal portions including cavities having peripheries conforming to peripheral portions of said article;
(b) pinch off surfaces extending around the peripheries of said cavities for fusing together opposing wall portions of a thermoplastic tubular blank in a heat plastified state on closing said sections on said blanks; and
(c) means for insulating said pinch off surfaces from said cooled internal portions to avoid substantially reducing the temperature of the portions of said heat plastified blank which contact said pinch off surfaces on closing said sections on said blank.

12. The blow mold of claim 11 wherein the means for insulating said punch off surfaces is an air gap between said surfaces and said cooled internal portions of the mold.

13. The blow mold of claim 12 wherein the means for insulating said pinch off surfaces is a layer of solid insulating material between said surfaces and said cooled internal portions of the mold.

14. A blow mold for shaping a container having a handle opening within the confines of a body portion of said container comprising:
(a) partible mold sections having internal portions defining a first cavity, the periphery of which conforms to the periphery of the body of said container and a second cavity within said first cavity having a periphery conforming to the periphery of said handle opening;
(b) pinch off surfaces extending around the peripheries of said first and second cavities for fusing together opposing wall portions of a thermoplastic tubular blank in a heat plastified state on closing said sections on said blank; and
(c) said second cavity having a cross sectional dimension measured in a direction perpendicular to the parting line of said mold which is greater than twice the thickness of the wall of said tubular blank to avoid contact of said blank with the surfaces of said cavity when said sections are closed, said second cavity having a solid layer of insulating material on the surface thereof.

15. The mold of claim 14 wherein said mold has cooled internal portions and including means for insulating the pinch off surfaces surrounding said second cavity from said cooled internal portions to avoid substantially reducing the temperature of the portions of said heat plastified blank which contact said pinch off surfaces surrounding the second cavity on closing said sections on said blank.

References Cited

UNITED STATES PATENTS

| | | | |
|---|---|---|---|
| 2,961,699 | 11/1960 | Dijksterhuis et al. | 18—Flash Digest |
| 3,000,051 | 9/1961 | Schaich | 264—99 |
| 3,032,809 | 5/1962 | Willard | 264—99 |
| 3,278,666 | 10/1966 | Donald | 264—94X |
| 3,310,620 | 3/1967 | Martelli et al. | 264—99X |
| 3,444,285 | 5/1969 | Mason | 264—161X |

ROBERT F. WHITE, Primary Examiner

T. J. CARVIS, Assistant Examiner

U.S. Cl. X.R.

18—5; 264—94, 161